(12) United States Patent
Sairanen

(10) Patent No.: US 7,869,837 B2
(45) Date of Patent: Jan. 11, 2011

(54) SYSTEM AND METHOD FOR IMPLEMENTING MOBILE IP NODE LOSSLESS TRANSITION FROM AN IDLE STATE TO AN AWAKE STATE

(75) Inventor: Jussi-Pekka Sairanen, Saratoga, CA (US)

(73) Assignee: Nokia Corporation, Espoo (FI)

( * ) Notice: Subject to any disclaimer, the term of this patent is extended or adjusted under 35 U.S.C. 154(b) by 908 days.

(21) Appl. No.: 11/610,436

(22) Filed: Dec. 13, 2006

(65) Prior Publication Data

US 2008/0144573 A1 Jun. 19, 2008

(51) Int. Cl.
*H04M 1/00* (2006.01)
*H04B 1/38* (2006.01)

(52) U.S. Cl. .............. 455/574; 455/412.1; 455/414.1; 455/432.1; 455/13.4; 455/127.1; 365/228

(58) Field of Classification Search .............. 370/331; 455/412.1–412.2, 574, 414.1, 432.1, 13.4, 455/127.1, 343.5; 365/228
See application file for complete search history.

(56) References Cited

U.S. PATENT DOCUMENTS

| 7,362,756 | B2* | 4/2008 | Choi et al. ................. 370/389 |
| 2004/0264396 | A1 | 12/2004 | Ginzburg | |
| 2005/0163080 | A1* | 7/2005 | Suh et al. ................... 370/331 |
| 2006/0217072 | A1* | 9/2006 | Poyhonen et al. ........ 455/67.11 |
| 2007/0091846 | A1* | 4/2007 | Kim et al. ................... 370/331 |
| 2007/0254677 | A1* | 11/2007 | Venkitaraman et al. ..... 455/458 |

FOREIGN PATENT DOCUMENTS

| EP | 1353479 | 10/2003 |
| KR | 20030056650 | 7/2003 |
| WO | 0019750 | 4/2000 |

OTHER PUBLICATIONS

Koodli, Fast Handovers for Mobile IPv6 Jul. 2005, Network Working Group, RFC 4068, 42 pages.*
PCT International Search Report and Written Opinion in International Application No. PCT/IB2007/055070, dated Jun. 10, 2008.
International Preliminary Report on Patentability in International Patent Application No. PCT/IB2007/055070, dated Jun. 25, 2009.

* cited by examiner

*Primary Examiner*—Nick Corsaro
*Assistant Examiner*—Munsoon Choo
(74) *Attorney, Agent, or Firm*—Banner & Witcoff, LTD

(57) ABSTRACT

A system and method for implementing a "lossless" transition from an idle state to an active or awake state in a mobile station. When a mobile station informs a serving base transceiver station that it is switching to an idle state, a virtual handover is executed, with the mobile station receiving a new Care of Address (CoA). The CoA is taken from an address space that is solely reserved for idle mobile station in a particular access network. The CoA is used to store data packets that are to be transmitted to the mobile station. Once the mobile station reenters an active state, the buffered packets can be forwarded to the mobile station without packet loss.

34 Claims, 5 Drawing Sheets

SYSTEM AND METHOD FOR IMPLEMENTING MOBILE IP NODE LOSSLESS TRANSITION FROM AN IDLE STATE TO AN AWAKE STATE

FIELD OF THE INVENTION

The present invention relates generally to the use of mobile stations in a Mobile IP environment. More particularly, the present invention relates to the preservation of data packets intended for a mobile station when the mobile station is transitioning from an idle state to an active state.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mobile IP is an Internet Engineering Task Force (IETF) standard communications protocol that allows mobile device users to move from one network to another while maintaining their permanent IP address. Through Mobile IP, nodes may change their point-of-attachment to the Internet without changing their IP address. This allows the nodes to maintain transport and higher-layer connections while moving. Node mobility is realized without having to propagate host-specific routes throughout the Internet.

Power consumption is a major concern for mobile network nodes. If a mobile station maintains an active connection with a respective base transceiver station for an extended period of time, it will quickly drain its battery. For this reason, mobile stations typically will enter an "idle state" when it is not receiving or transmitting data.

When a mobile station switches to an idle state, it informs its serving base transceiver station that it will be reachable only at certain points of time. Therefore, if the base transceiver station later needs to awaken the mobile station due to incoming data, it has to wait for the next contact time to inform the mobile station that it needs to wake up in order to receive the data. However, before the mobile station reaches the active state and is ready to receive data packets, a large number of data packets may have accumulated waiting for transmission in the serving base transceiver station. Since a number of other mobile stations may be in a similar situation at any given moment, a relatively low capacity base transceiver station or other network element may be forced to discard data packets that are intended for the various mobile stations, resulting in undesirable packet loss. Furthermore, situations will inevitably arise where the mobile station, due to its mobile nature, becomes temporarily unreachable by the base transceiver station. In this situation, the packets buffered by the base transceiver station must be moved over to the new serving base transceiver station, doubly burdening the low bandwidth "last mile" data link of the base transceiver station.

It would therefore be desirable to provide a system and method by which a mobile station can effectively transition from an idle state to an active state without consistently suffering packet loss due to the reasons discussed above.

SUMMARY OF THE INVENTION

Various embodiments of the present invention provide an improved system for implementing a "lossless" transition from an idle state to an active or awake state in a mobile station. According to various embodiments, when a mobile station informs a serving base transceiver station that it is switching to an idle state, a virtual handover is executed, with the mobile station receiving a new Care of Address (CoA). The CoA is taken from an address space that is solely reserved for idle mobile station in a particular access network. The CoA is used to store data packets that are to be transmitted to the mobile station. Once the mobile station reenters an active state, the buffered packets can be forwarded to the mobile station without packet loss.

The idle node state transition system of the various embodiments of the present invention does not require the altering of the standard behavior of the various network elements. Routing processes, MIPv4 Foreign Agent process, etc. do not need to be modified in order to cope with idle network nodes.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Various embodiments of the present invention provide an improved system for implementing a "lossless" transition from an idle state to an active or awake state in a mobile station. According to various embodiments, when a mobile station informs a serving base transceiver station that it is switching to an idle state, a virtual handover is executed, with the mobile station receiving a new CoA. The CoA is taken from an address space that is solely reserved for idle mobile station in a particular access network. The CoA is used to store data packets that are to be transmitted to the mobile station. Once the mobile station reenters an active state, the buffered packets can be forwarded to the mobile station without packet loss.

Figure 1:
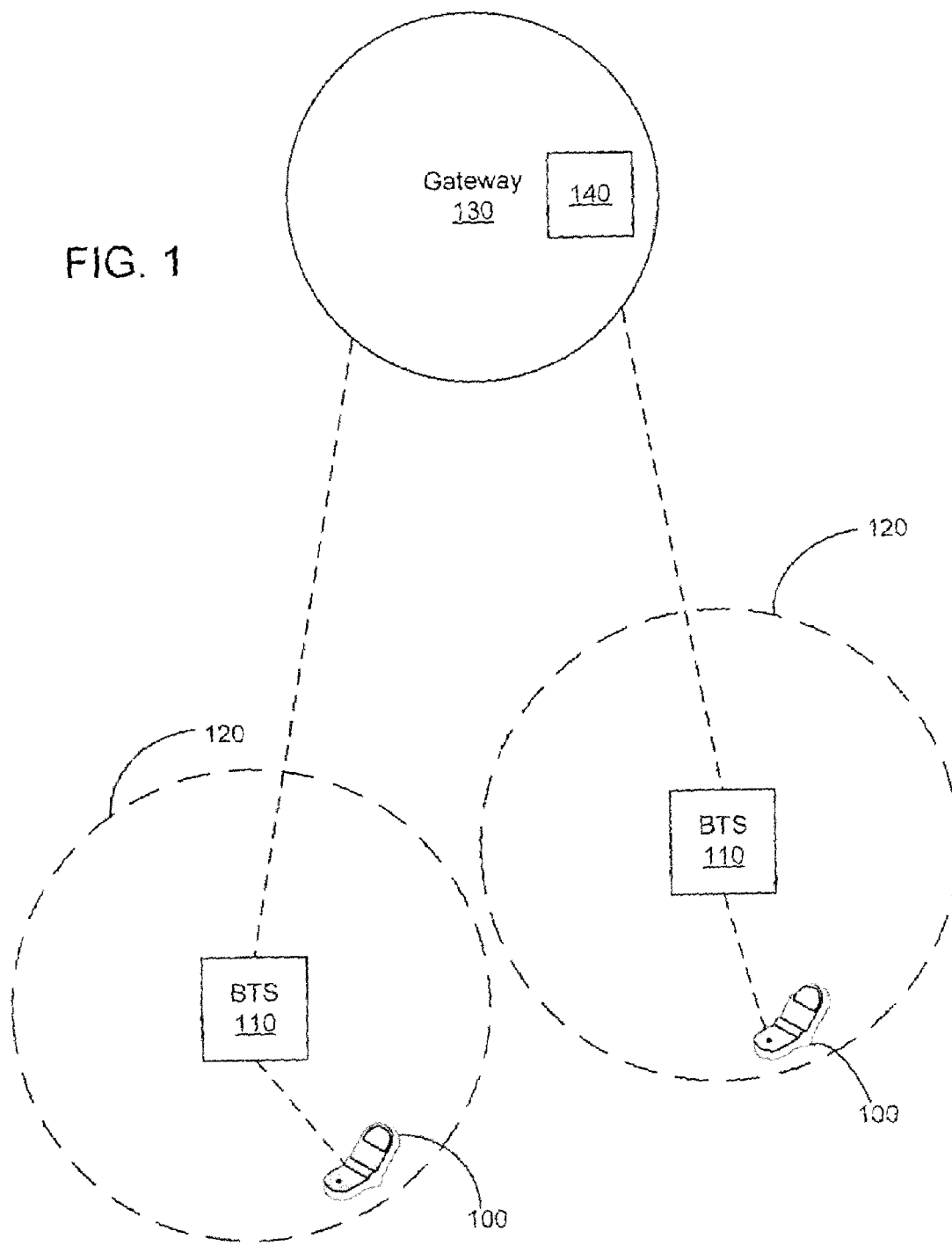
FIG. 1 is a diagram showing the interaction between a plurality of mobile stations, a plurality of base transceiver stations, and a gateway within which various embodiments of the present invention may be implemented.

FIG. 1 is a diagram showing the interaction between a plurality of mobile stations, a plurality of base transceiver stations, and a gateway within which various embodiments of the present invention may be implemented. As shown in FIG. 1, mobile stations 100 (shown as mobile telephones in FIG. 1) are communicatively connected to a nearby base transceiver station 110 if they are positioned within the respective base transceiver station's coverage area 120. Each base transceiver station 110 communicates with a access network gateway 130 through which data is transmitted to and from the various mobile stations 100. The access network gateway 130 include also includes an idle node manager 140, which represents in a network device layer a process for buffering data packets intended for the mobile stations 100 while they are being woken up.

Figure 2:
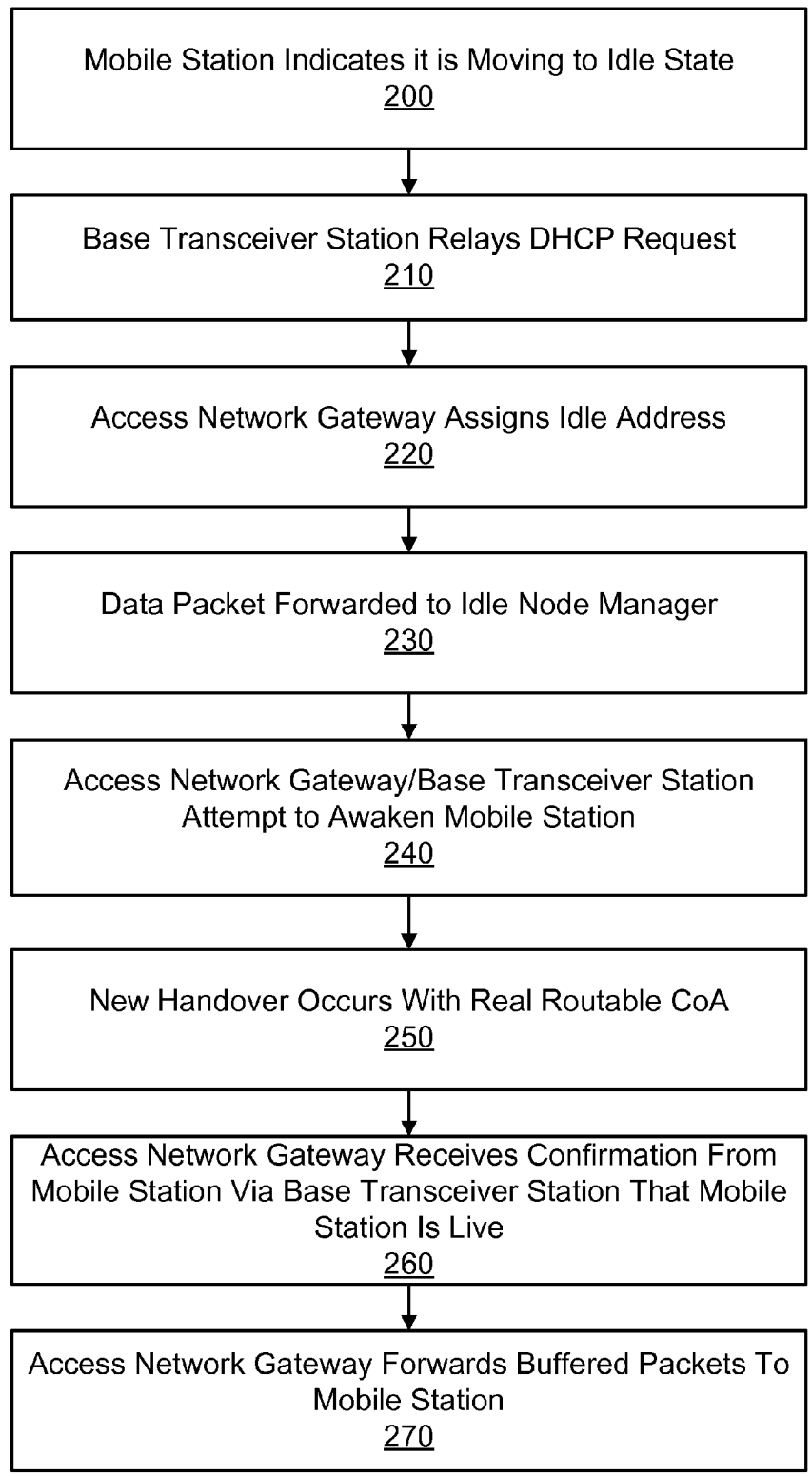
FIG. 2 is a flow chart showing a process by which CoAs are assigned in accordance with various embodiments of the present invention.

FIG. 2 is a flow chart showing a process by which various embodiments of the present invention are implemented. At 200 in FIG. 2, a mobile station 100 informs its respective base transceiver station 110 that it is switching to an idle state. In response to this action, a "virtual handover" is implemented, involving the assigning of a CoA to the mobile station 100. The CoA is taken from an address space that is solely reserved for idle stations in a particular access network. At 210, the base transceiver station 110 relays from the mobile station 100 a dynamic host configuration protocol (DHCP) request to the access network gateway 130. If the mobile station 100 has previously been idle in this access network, then the mobile station 100 may specifically request for the same IP address that the mobile station 100 previously had. Before forwarding the DHCP request, the base transceiver station 110 checks that the requested address is an address from the idle address space and, if it is not such an address, replaces it with an address that is likely to be in the idle address space. The access network gateway 130, acting as a DHCP server, makes the final decision as to the address that is to be assigned and grants a suitable idle address for the mobile station 100 at 220. In the event that the Mobile IPv4 (MIPv4) protocol is being used, the access network Foreign Agent (FA) is made aware of the mobile station's new CoA.

In the access network gateway 130, the idle address space requires special treatment. Therefore, one network interface is reserved for forwarding data to the idle nodes. In various embodiments, this interface is a virtual interface and represents in the network device layer a process that is capable of buffering data packets for the mobile station 100 while it is being woken up. This process also handles the control traffic necessary in the MS state transition. This process is referred to herein as the idle node manager 140. The idle node manager 140 maintains a database of the idle mobile station media access control (MAC) addresses/IP addresses mapped to the respective controlling base transceiver stations 110.

At 230, a data packet intended for the mobile station 100 is forwarded to the idle node manager 140. This means that target mobile station 100 is idling and therefore needs to be woken up in order to receive the data packet. In response to this indication, at 240 the access network gateway 130, in conjunction with the proper base transceiver station 110, proceeds to awaken the mobile station 100 at the proper time. Additionally, a new handover also takes place at 250, in which a real routable CoA is obtained for the mobile station 100. This CoA can be obtained by different standard processes known in the art. At 260, the access network gateway 130 receives a confirmation from the mobile station 100 via the base transceiver station 110 that the mobile station 100 is live. In response, at 270 the access network gateway 130 can forward the buffered packets to the mobile station 100.

Figure 3:
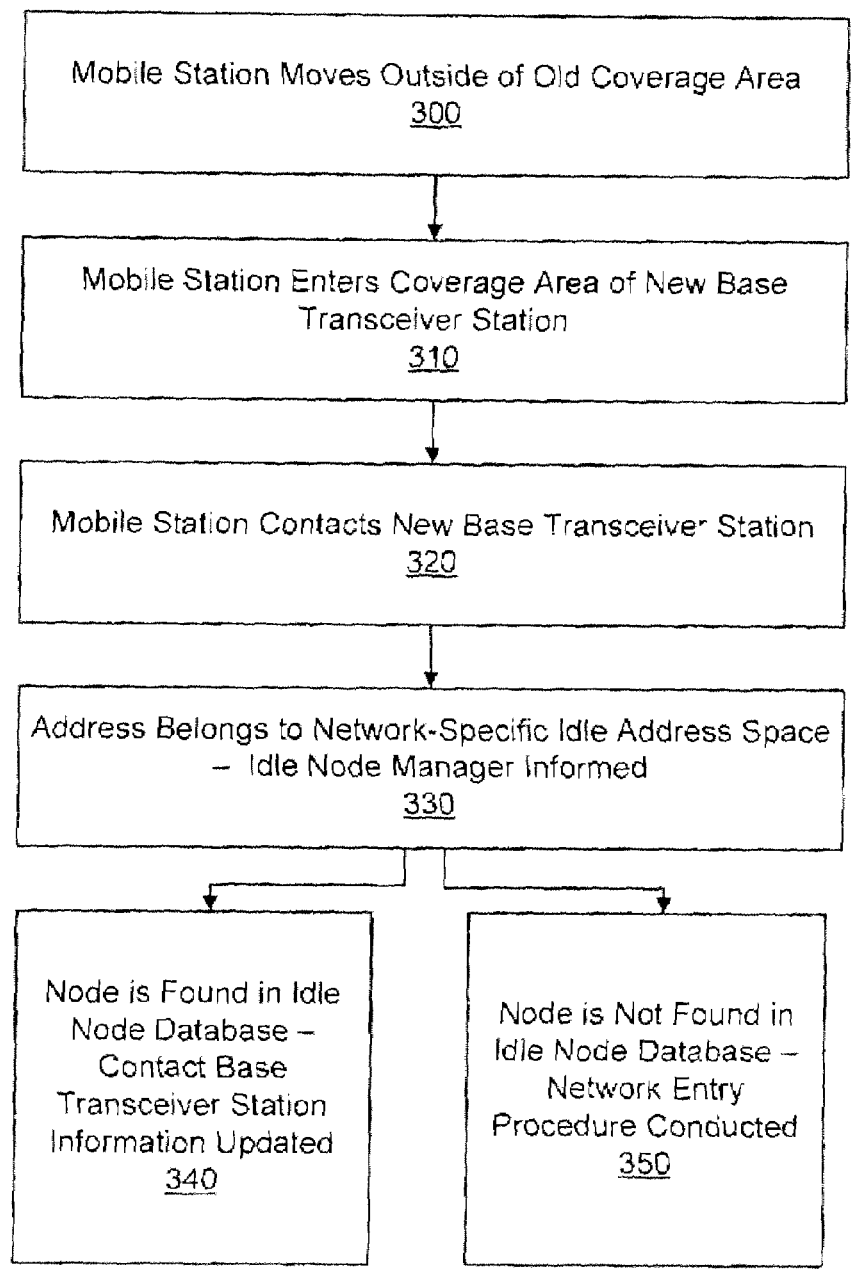
FIG. 3 is a flow chart showing a process by which base transceiver station information is updated when a mobile station that has entered an idle state enters a coverage area of a new base transceiver station.

FIG. 3 shows a situation where a mobile station 100 may leave a certain coverage area 120 and enter a new such area at a later time. In certain situations, the mobile station 100 may, when in the idle state, move outside of the coverage area 120 of its previous base transceiver station 110. This is represented at 300 in FIG. 3. In such situation, the mobile station 100 will temporarily be prevented from exchanging data with the access network gateway 130. At some point in the future, the mobile station 100 will enter the coverage area 120 of a different base transceiver station 110, as represented at 310, and attempt to contact the new base transceiver station 110 at 320. As part of this contact, the mobile station 100 provides the new base transceiver station 120 with the mobile station's CoA and MAC address. If the new base transceiver station 120 recognizes the IP address as belonging to the access network-specific idle address space, then at 330 it will inform the idle node manager 140 that it is now attached to the mobile station 100. The idle node manager 140, in response, checks that its idle node database indeed contains the given MAC address/idle CoA combination and, if so, updates the contact base transceiver station information accordingly at 340. If the node is not found in the idle node database, then it means that that the node has moved from another access network, in which case a network entry procedure must be carried out. This is represented at 350.

In various embodiments of the present invention, the DHCP relay function of the base transceiver station 110 is enhanced so that it may recognize and request an IP address from the idle node manager 140 when needed. Additionally, the access network gateway DHCP server needs to be idle address aware. A special kernel network interface also may be implemented.

Figure 4:
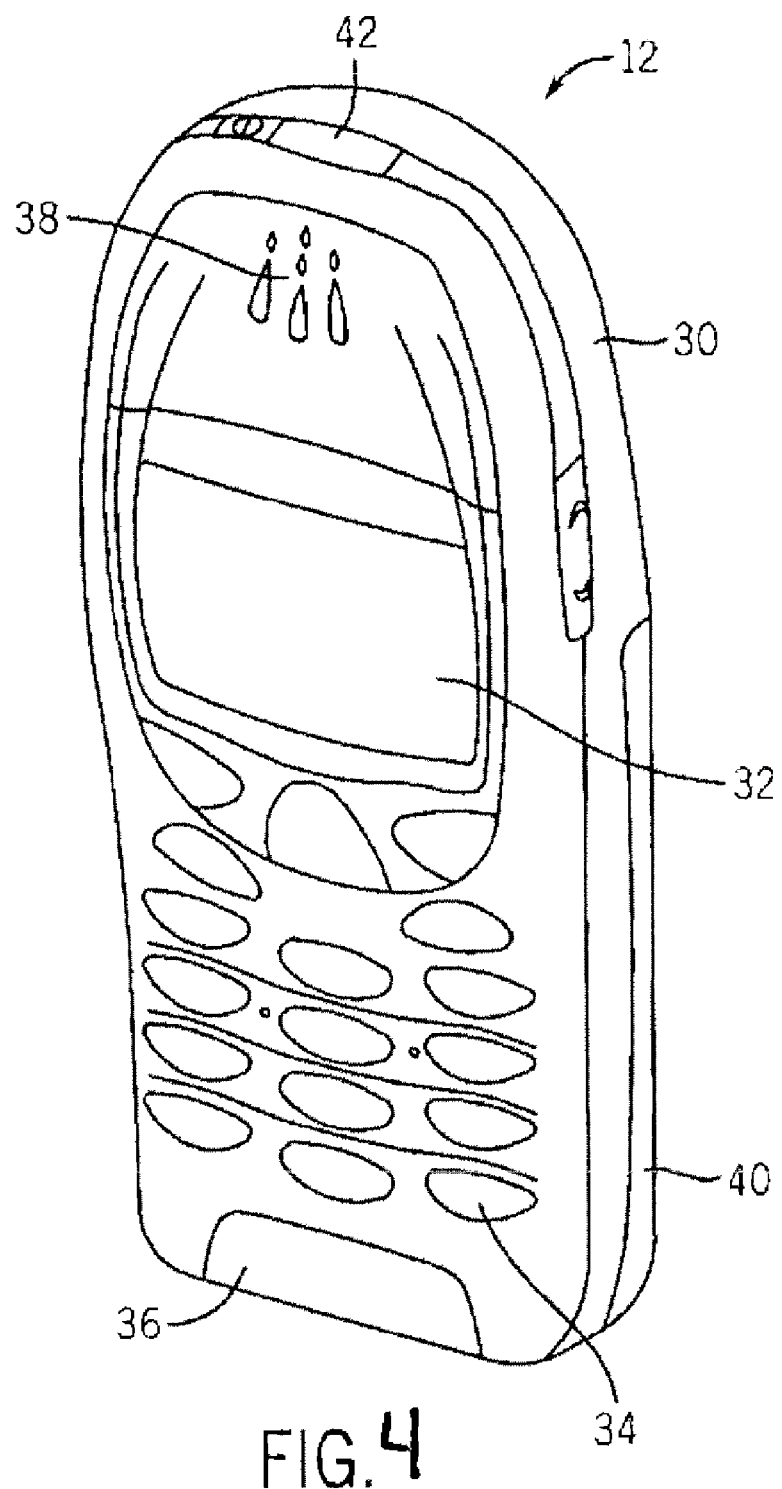
FIG. 4 is a perspective view of a mobile telephone that can be used in the implementation of the present invention.
Figure 5:
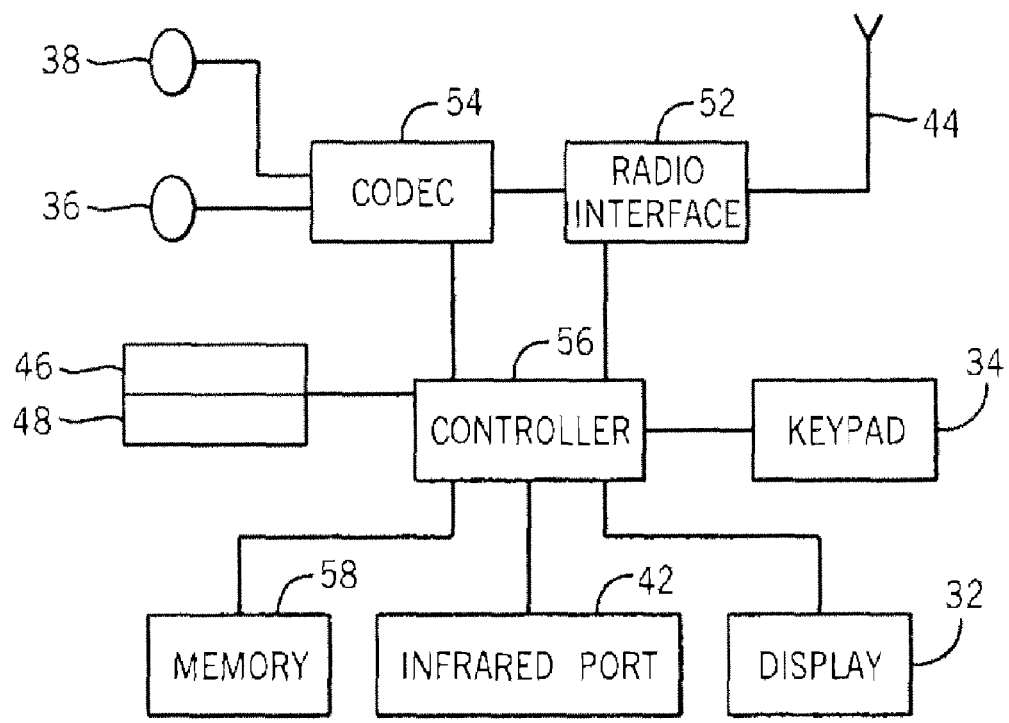
FIG. 5 is a schematic representation of the telephone circuitry of the mobile telephone of FIG. 4.

FIGS. 4 and 5 show one representative mobile telephone 12 within which the present invention may be implemented. It should be understood, however, that the present invention is not intended to be limited to one particular type of mobile telephone 12 or other electronic device. The mobile telephone 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, and a memory 58. Individual circuits and elements are all of a type well known in the art, for example in the Nokia range of mobile telephones.

Communication devices implementing various embodiments of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   receiving a request to assign a Care of Address (CoA) to a mobile station when the mobile station enters an idle state;
   responsive to determining that the requested CoA is an address from an idle address space, selecting the requested CoA, and responsive to determining that the requested CoA is not an address from the idle address space, selecting a new CoA;
   receiving a data packet intended for the mobile station; and
   forwarding the data packet to the selected CoA.

2. The method of claim 1, further comprising, after selecting the selected CoA, notifying an access network foreign agent of the selected CoA.

3. The method of claim 1, wherein the request includes a suggested CoA for the mobile station.

4. The method of claim 3, wherein the suggested CoA is a CoA previously assigned to the mobile station for use during a previous idle state.

5. The method of claim 1, further comprising:
   after the data packet is forwarded to the selected CoA, attempting to awaken the mobile station;
   buffering the data packet and any subsequent data packets intended for the mobile station;
   receiving an indication that the mobile station has entered a live state; and
   forwarding the data packet and the subsequent data packets to the mobile station.

6. The method of claim 1, further comprising, after selecting the selected CoA, storing and mapping a combination of the selected CoA and a media access control (MAC) address for the mobile station to a base transceiver station.

7. The method of claim 6, further comprising:
   receiving an indication that the mobile station has attempted to obtain access to a network through a different base transceiver station, the indication including a candidate CoA and MAC address;
   verifying that the candidate CoA and MAC address match a stored CoA/MAC address combination for the mobile station; and
   if the candidate CoA and MAC address match the stored CoA/MAC address combination, updating the mapping of the stored CoA/MAC address combination to correspond to the different base transceiver station.

8. A computer program product, embodied in a computer-readable medium, including computer code for implementing the processes of claim 1.

9. A computer program product, embodied in a computer-readable medium, including computer code for implementing the processes of claim 5.

10. A computer program product, embodied in a computer-readable medium, including computer code for implementing the processes of claim 7.

11. An apparatus, comprising:
    a processor; and
    a memory unit communicatively connected to the processor and comprising computer-executable instructions that, when executed by the processor, cause the apparatus at least to perform:
    receive a request to assign a Care of Address (CoA) to a mobile station when the mobile station enters an idle state;
    responsive to determining that the requested CoA is an address from an idle address space, select the requested CoA, and responsive to determining that the requested CoA is not an address from the idle address space, select a new CoA;
    receive a data packet intended for the mobile station; and
    forward the data packet to the selected CoA.

12. The apparatus of claim 11, wherein the memory unit further comprises computer-executable instructions that, when executed by the processor, cause the apparatus at least to perform:
    after selecting the selected CoA, notify an access network foreign agent of the selected CoA.

13. The apparatus of claim 11, wherein the request includes a suggested CoA for the mobile station.

14. The apparatus of claim 13, wherein the suggested CoA is a CoA previously assigned to the mobile station for use during a previous idle state.

15. The apparatus of claim 11, wherein the memory unit further comprises computer-executable instructions that, when executed by the processor, cause the apparatus at least to perform:
    after the data packet is forwarded to the selected CoA, attempt to awaken the mobile station;
    buffer the data packet and any subsequent data packets intended for the mobile station; and
    in response to receiving an indication that the mobile station has entered a live state, forward the data packet and the subsequent data packets to the mobile station.

16. The apparatus of claim 11, wherein the memory unit further comprises computer-executable instructions that, when executed by the processor, cause the apparatus at least to perform:
    after selecting the selected CoA, store and map a combination of the selected CoA and a media access control (MAC) address for the mobile station to a base transceiver station used by the mobile station.

17. The apparatus of claim 16, wherein the memory unit further comprises computer-executable instructions that, when executed by the processor, cause the apparatus at least to perform:
    in response to receiving an indication that the mobile station has attempted to obtain access to a network through a different base transceiver station, the indication including a candidate CoA and MAC address, verify that the candidate CoA and MAC address match a stored CoA/MAC address combination for the mobile station; and
    if the candidate CoA and MAC address match the stored CoA/MAC address combination, update the mapping of the stored CoA/MAC address combination to correspond to the different base transceiver station.

18. A system comprising:
a mobile station configured to operate in an idle state and a live state;
a first base transceiver station at least selectively communicatively connected to the mobile station; and
an access network gateway at least selectively communicatively connected to the mobile station, the access network gateway configured to receive from the first base transceiver station a request to assign a Care of Address (CoA) to the mobile station when the mobile station enters the idle state,
responsive to determining that the requested CoA is an address from an idle address space, select the requested CoA, and responsive to determining that the requested CoA is not an address from the idle address space, select a new CoA,
receive a data packet intended for the mobile station, and
forward the data packet intended for the mobile station to the selected CoA when the mobile station is in the idle state.

19. The system of claim 18, wherein the first base transceiver station is configured to suggest to the access network gateway a candidate CoA for the mobile station.

20. The system of claim 19, wherein the suggested CoA is a CoA previously assigned to the mobile station for use when previously in the idle state.

21. The system of claim 18, wherein the access network gateway is further configured to:
after the data packet is forwarded to the selected CoA, attempt to awaken the mobile station;
buffer the data packet and any subsequent data packets intended for the mobile station; and
in response to the receipt of an indication that the mobile station has entered the live state, forward the data packet and the subsequent data packets to the mobile station.

22. The system of claim 18, wherein the access network gateway is further configured to, after selecting the selected CoA, store and map a combination of the selected CoA and a media access control (MAC) address for the mobile station to the first base transceiver station.

23. The system of claim 22, wherein the access network gateway is further configured to:
receive an indication that the mobile station has attempted to obtain access to a network through a second base transceiver station, the indication including a candidate CoA and MAC address;
verify that the candidate CoA and MAC address match the stored CoA/MAC address combination for the mobile station; and
if the candidate CoA and MAC address match the stored CoA/MAC address combination, update the mapping of the stored CoA/MAC address combination to correspond to the second base transceiver station.

24. A method comprising:
indicating to a first base transceiver station that a mobile station is to enter an idle state;
in response to the indication, receiving from the first base transceiver station a Care of Address (CoA) assigned by an access network gateway, the received CoA corresponding to a requested CoA when the requested CoA is an address from an idle address space, and the received CoA corresponding to a new CoA when the requested CoA is not an address from the idle address space.

25. The method of claim 24, further comprising:
returning to an active state from the idle state; and
receiving from the received CoA data packets that were intended to be transmitted to the mobile station when in the mobile station was in the idle state.

26. The method of claim 24, wherein the indication includes a prior CoA used by the mobile station when previously in an idle state.

27. The method of claim 24, further comprising:
exiting a coverage area for the first base transceiver station;
entering a coverage area for a second base transceiver station;
transmitting to the second base transceiver station an attempt to obtain access to a network, the attempt including the received CoA and a MAC address for the mobile station.

28. A computer program product, embodied in a computer-readable medium, including computer code for implementing the processes of claim 24.

29. A computer program product, embodied in a computer-readable medium, including computer code for implementing the processes of claim 25.

30. A computer program product, embodied in a computer-readable medium, including computer code for implementing the processes of claim 27.

31. An apparatus comprising:
a processor; and
a memory unit communicatively connected to the processor comprising computer-executable instructions that, when executed by the processor, cause the apparatus at least to perform:
indicating indicate to a first base transceiver station that the apparatus is to enter an idle state, and
process a Care of Address (CoA) received from the first base transceiver station, the CoA assigned by an access network gateway in response to the indication, the received CoA corresponding to a requested CoA when the requested CoA is an address from an idle address space, and the received CoA corresponding to a new CoA when the requested CoA is not an address from the idle address space.

32. The apparatus of claim 31, wherein the memory unit further comprises computer-executable instructions that, when executed by the processor, cause the apparatus at least to perform:
return to an active state from the idle state; and
process data packets received from the received CoA, the data packets having been intended to be transmitted to the apparatus when the apparatus was in the idle state.

33. The apparatus of claim 31, wherein the indication includes a prior CoA used by the mobile station when previously in an idle state.

34. The apparatus of claim 31, wherein the memory unit further comprises computer-executable instructions that, when executed by the processor, cause the apparatus at least to perform:
in response to exiting a coverage area for the first base transceiver station and entering a coverage area for a second base transceiver station, transmitt to the second base transceiver station an attempt to obtain access to a network, the attempt including the received CoA and a MAC address for the apparatus.

* * * * *